United States Patent
Kubota et al.

(10) Patent No.: US 8,040,977 B2
(45) Date of Patent: Oct. 18, 2011

(54) RECEPTION SYNCHRONIZATION CONTROL DEVICE, RECEPTION SYNCHRONIZATION CONTROL METHOD, AND PROGRAM THEREFOR

(75) Inventors: Seiji Kubota, Kawasaki (JP); Masaki Isogai, Kawasaki (JP); Sumito Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 859 days.

(21) Appl. No.: 11/896,064

(22) Filed: Aug. 29, 2007

(65) Prior Publication Data

US 2008/0116969 A1    May 22, 2008

(30) Foreign Application Priority Data

Nov. 22, 2006   (JP) ................................ 2006-316244

(51) Int. Cl.
  *H04L 5/12* (2006.01)
  *H04L 27/22* (2006.01)
  *H04L 7/00* (2006.01)
  *H03D 3/02* (2006.01)

(52) U.S. Cl. .................. 375/322; 375/261; 375/354

(58) Field of Classification Search .................. 375/261, 375/279, 280, 281, 324, 329, 332, 354, 322; 329/304; 702/60, 67
See application file for complete search history.

(56) References Cited

U.S. PATENT DOCUMENTS 5,861,773 A    1/1999 Meyer
5,889,759 A    3/1999 McGibney
2004/0005017 A1    1/2004 Borowski
2005/0169394 A1*    8/2005 Jeong ........................... 375/261

FOREIGN PATENT DOCUMENTS

JP    11-331299    11/1999
JP    2001-024603    1/2001

OTHER PUBLICATIONS

Korean Patent Office "Decision to Grant a Patent" (Dated Aug. 4, 2009).

* cited by examiner

*Primary Examiner* — Betsy Deppe
(74) *Attorney, Agent, or Firm* — Fujitsu Patent Center

(57) ABSTRACT

This invention provides a reception synchronization control device that controls reception synchronization of demodulated signals to be established, the demodulated signals being obtained by demodulating a phase modulated signal transmitted by a phase modulation, wherein the reception synchronization control device includes a signal level detector that detects signal levels of sampled demodulated signals extracted by sampling analog demodulated signals; a constellation position specifier that specifies constellation positions of plural kinds of data contained in the sampled demodulated signals displayed on a polar coordinates display based on the detected signal levels; and a phase angle difference calculation processor that calculates a difference between a phase angle calculated based on the specified constellation positions and a reference phase angle, thereby controlling the phase angle so that the difference is within a predetermined range. Further, the invention discloses a reception synchronization control method, to control reception synchronization of demodulated signals to be established, using the above reception synchronization control device, etc.

15 Claims, 11 Drawing Sheets

Fig.11
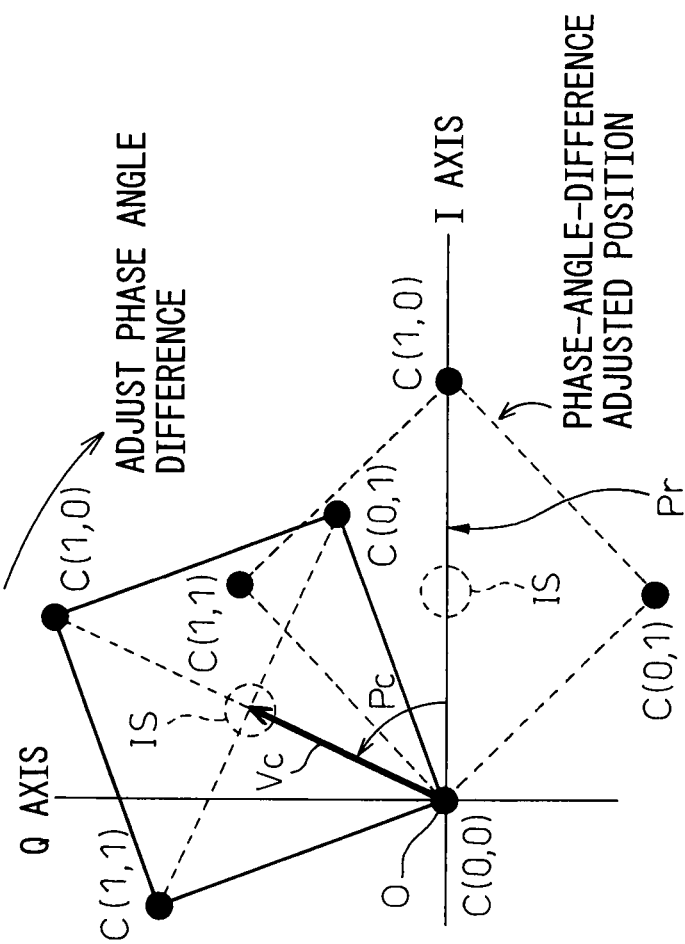
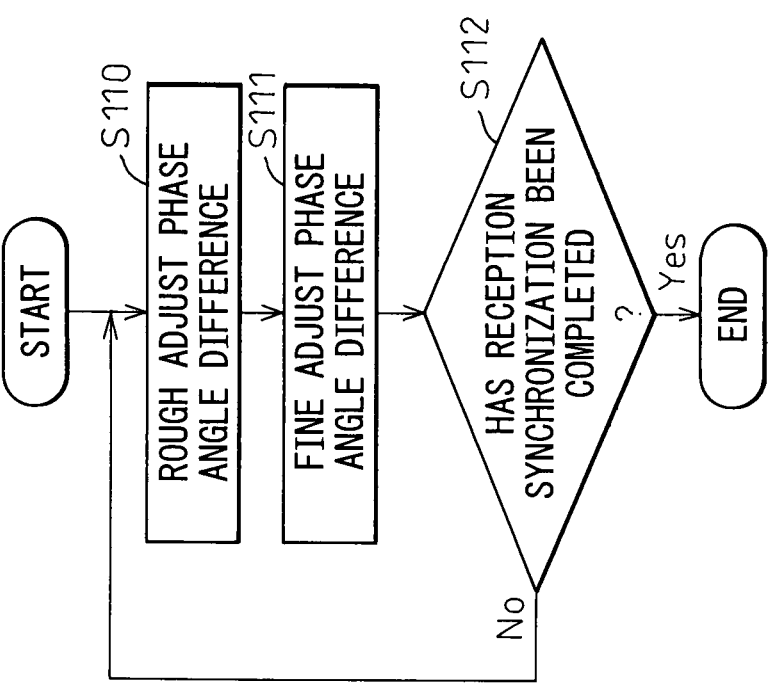

RECEPTION SYNCHRONIZATION CONTROL DEVICE, RECEPTION SYNCHRONIZATION CONTROL METHOD, AND PROGRAM THEREFOR

BACKGROUND OF THE INVENTION

1. Field of the Invention

The present invention relates to a reception synchronization control device and a reception synchronization control method for controlling reception synchronization of demodulated signals (for example, analog modulated signals of at least two channels) to be established when a radio communication apparatus such as a cellular phone receives and demodulates a phase-modulated signal transmitted by a phase modulation, and relates to a program for making a computer execute this reception synchronization control method.

At the time of receiving a phase-modulated signal transmitted by using a QPSK (quadrature phase-shift keying) modulation, as one kind of a phase modulation of digital data, and demodulating the phase-modulated signal into analog demodulated signals of two channels in a mutually orthogonal relationship, it is necessary to extract the original four-value digital data from two-channel analog demodulated signals without an error. It is also necessary to confirm whether or not the reception of the analog demodulated signal is synchronized in all frequencies used by carrying out an adjustment test of a reception card on which a demodulator of a cellular phone and the like is mounted. The present invention describes a method of establishing a state of reception synchronization, by confirming by a simple method whether or not a reception of the analog demodulated signal is synchronized.

2. Description of the Related Art

In general, in the manufacture of a radio communication apparatus such as a cellular phone, a reception card on which a demodulator of the apparatus is mounted is manufactured separately from another card within the radio communication apparatus. Therefore, at the stage of carrying out the adjustment test of the reception card, the reception card within the radio communication apparatus is separated from the other card. Accordingly, a state of reception synchronization needs to be established by confirming whether or not the reception of the reception card is synchronized, for each card.

In order to facilitate the understanding of a problem in confirming whether or not reception is synchronized by carrying out an adjustment test of reception synchronization of the reception card within the radio communication apparatus according to a conventional system, a process in which a reception card testing device according to the conventional system is used to carry out the adjustment test of reception synchronization of the reception card will be explained with reference to FIG. 1 that will be described later in the "BRIEF DESCRIPTION OF THE DRAWINGS".

A block diagram of a configuration of a reception card testing device according to a conventional reception synchronization establishing method is illustrated in FIG. 1. More specifically, FIG. 1 shows a schematic configuration of the reception card testing device that carries out an adjustment test of each reception card as a single unit within a radio communication apparatus such as a cellular phone used in a W-CDMA (Wideband Code Division Multiple Access) format.

As shown in FIG. 1, the radio communication apparatus, such as a cellular phone, usually includes a demodulator (that is, a demodulating unit) 1 that receives a phase-modulated signal S-QPSK transmitted by a phase modulation of digital data such as a QPSK modulation system, and demodulates this phase-modulated signal into two-channel analog demodulated signals SA-I and SA-Q; and an analog/digital converter (an A/D converter) 2 that converts the analog demodulated signals SA-I and SA-Q output from the demodulator 1 into digital demodulated signals SD-I and SD-Q. The analog demodulated signals SA-I and SA-Q are substantially cyclical two-channel signals mutually in an orthogonal phase relationship, and are expressed by a change of output voltage V relative to time (r).

Further, an output signal processor 9 is provided at the output side of the analog/digital processor 2. This output signal processor 9 reproduces digital data of a satisfactory signal-to-noise ratio (S/N ratio), by carrying out various kinds of signal processes such as a calculation of bit error rate and a bit error correction to the digital demodulated signals SD-I and SD-Q output from the analog/digital converter (A/D converter) 2.

For the radio communication apparatus, such as a cellular phone, a reception card mounted with the demodulator 1 and the analog/digital converter 2 is manufactured separately from another card mounted with the signal processor 9. Confirmation of whether or not reception of a reception card is synchronized and adjustment of reception synchronization are carried out before the product is shipped. At the stage of carrying out the adjustment test of reception synchronization of a reception card, the adjustment test of the reception card is carried out as a single unit in a state that the reception card is separated from another card. It should be noted that the reception card itself does not have a function of carrying out an adjustment test of reception synchronization. Therefore, in carrying out the adjustment test of reception synchronization of a reception card, the reception card needs to be able to artificially carry out the adjustment test of reception synchronization in some way.

Therefore, in the reception card testing device according to the conventional reception synchronization establishing method, an oscilloscope or the like to monitor reception synchronization of the reception card is connected to the output of the analog/digital converter 2 within the reception card, as shown in FIG. 1. This oscilloscope usually includes a signal display controller 3 and a polar coordinates display 4, and is able to display polar coordinates of digital demodulated signals SD-I and SD-Q output from the analog/digital converter 2. The signal display controller 3 processes the digital demodulated signals SD-I and SD-Q output from the analog/digital converter 2, and generates signal data SP-I and SP-Q to display the polar coordinates. The polar coordinates display 4 displays the signal data SP-I and SP-Q output from the signal display controller 3 onto the display surface (i.e., display screen) of the polar coordinates. Accordingly, the reception card is able to confirm a reception synchronization state.

On the display screen of the polar coordinates display 4 shown in FIG. 1, digital data C (0, 0), C (0, 1), C (1, 0), and C (1, 1) at four points (shown by black circles), each of which has a phase difference of 90 degrees from the phase of the adjacent point, are displayed in a first quadrant to a fourth quadrant, respectively of I-Q coordinate space, including an I axis and Q axis. The digital data at the four points on the display screen change with time due to noise, etc. Therefore, the digital data are displayed in a form in which each of the four points has a certain two-dimensional broadening from an ideal point on the display screen.

In carrying out the adjustment test of reception synchronization of a reception card using the reception card testing device shown in FIG. 1, conventionally, a constellation position of digital data appearing most densely on the display screen is visually estimated, while visually monitoring digital data displayed with a certain spread in the I-Q coordinate space on the display screen of the oscilloscope. Next, parameters such as voltage value and potential on the display screen of digital data are changed based on the estimated constellation position, thereby adjusting the state of reception synchronization of the reception card, and confirming whether or not the reception of the analog demodulated signals of two channels is synchronized. Finally, when it is confirmed that the reception of the analog demodulated signal is synchronized, the phases of the digital data are locked, thereby establishing a state of reception synchronization. In this case, in order to guarantee performance of the radio communication apparatus as a product, the state of reception synchronization needs to be established by confirming whether or not the reception of the analog demodulated signal is synchronized in all frequencies used.

The "constellation" refers to a portion formed by the four points most densely displayed on the display screen of the oscilloscope in the form of an asterism or constellation, when plural signal data are displayed in the polar coordinates.

In carrying out the adjustment test of reception synchronization of the reception card using the conventional method, an operator must adjust the state of reception synchronization of the reception card while continue to monitor the digital data at four points displayed on the display screen of the oscilloscope. Further, in order to guarantee the performance of the product, the operator must confirm whether or not the reception of the analog demodulated signal is synchronized in all frequencies used. Therefore, the operator is required to spend time adjusting the state of the reception synchronization of the reception card. Consequently, the adjustment work of the state of the reception synchronization becomes troublesome.

When plural operators carry out an adjustment test of the reception synchronization, variations in the adjustment may occur depending on the sense of individual operators. Therefore, it is difficult to guarantee the quality of the state of reception synchronization established by the adjustment test.

On the other hand, in order to establish a state of reception synchronization of an analog demodulated signal by automatically carrying out the test, dedicated hardware is necessary to adjust the state of reception synchronization by automatically changing parameters of voltage values and phases of digital data displayed on the display screen of the oscilloscope. However, in this case, additional cost is necessary to prepare dedicated hardware.

For reference, the following Patent Document No. 1 and Patent Document No. 2 relevant to the above conventional reception synchronization establishing method are shown as prior-art documents.

(i) Patent Document No. 1: Japanese Unexamined Patent Publication (Kokai) No. 11-331299

(ii) Patent Document No. 2: Japanese Unexamined Patent Publication (Kokai) No. 2001-24603

Patent Document No. 1 discloses a 64-QAM modulation and 256-QAM modulation analysis method, including detecting a maximum value and a minimum value of amplitudes at symbol points of an input signal; determining a gain from the detected minimum value (or the maximum value) and a prescribed value; multiplying this gain to an amplitude of the symbol points of the input signal; rotating the phase of the row of the symbol points of the input signal multiplied by the gain, by a predetermined amount; obtaining an ideal symbol point row by demodulating the symbol point row of the input signal of which phase is rotated; obtaining a correlation between this ideal symbol point row and the symbol point row of the input signal of which phase is rotated; and obtaining a positional rotation of the symbol points, a generation of an ideal symbol point row, and the above correlation, until a predetermined amount of phase rotation becomes π/4 radian (45 degrees). However, Patent Document 1 does not describe a method of establishing a state of reception synchronization by confirming whether the reception of the analog demodulated signal is synchronized at the time of receiving a phase-modulated signal transmitted by the phase modulation of digital data, such as QPSK modulation and demodulating the phase-modulated signal into analog demodulated signals of plural channels.

Patent Document No. 2 describes a method of transmitting a radio signal, by obtaining an identification number and signal quality of a radio broadcast program from a radio signal and using a propagation wave signal obtained from the best signal quality to receive a selected radio broadcast signal, in transmitting the radio signal by an orthogonal frequency division multiplexing system. However, Patent Document No. 2 does not describe a method of establishing a state of reception synchronization by confirming whether or not the reception of the analog demodulated signal is synchronized, at the time of receiving a phase-modulated signal transmitted by the phase modulation of digital data and demodulating the phase-modulated signal into analog demodulated signals of plural channels.

Therefore, none of Patent Document No. 1 and Patent Document No. 2 can solve problems generated when visually confirming whether or not reception is synchronized by carrying out the adjustment test of reception synchronization of a reception card of a radio apparatus by the conventional method.

SUMMARY OF THE INVENTION

The present invention has been made in the light of the above problems. It is an object of the present invention to provide a reception synchronization control device, a reception synchronization control method, and a program therefor, capable of establishing a reception synchronization state in a short amount of time by confirming whether or not a reception of a demodulated signal is synchronized in a simple method without requiring an operator to always monitor a reception synchronization state of a reception card using an oscilloscope or the like, in carrying out an adjustment test of the reception card within a radio communication apparatus, and capable of guaranteeing the quality of the state of reception synchronization by avoiding a variation of the adjustment test carried out by the operator.

In order to achieve the above object, a reception synchronization control device according to the present invention has a demodulator that receives a signal transmitted by a phase modulation and demodulates the received signal into analog demodulated signals of at least two channels, and includes a signal level detector that detects signal levels of demodulated signals from the analog demodulated signals; a constellation position specifier that specifies constellation positions of plural kinds of data contained in the demodulated signals on the polar coordinates, when displaying the demodulated signals based on the detected signal levels; and a phase angle difference calculation processor that calculates a difference (a phase angle difference) between a phase angle calculated based on the constellation positions of the specified plural kinds of data and a reference phase angle, wherein the phase angle difference calculation processor controls the phase angle so that a difference between the phase angle and the reference phase angle is within a predetermined range, thereby establishing reception synchronization of the analog demodulated signals.

Preferably, in the reception synchronization control device according to the present invention, a data position estimator extracts data of at least four points corresponding to the demodulated signals of a highest appearance frequency from the demodulated signals displayed on the display screen of the polar coordinates (for example, digital data of four points each of which has a phase difference of 90 degrees from the phase of the adjacent point), thereby specifying constellation positions of the data of at least four points.

More preferably, in the reception synchronization control device according to the present invention, the phase angle difference calculation processor shifts the data of at least four points so that a constellation position of one data among the data of at least four points coincides with a reference point within the display surface of the polar coordinates, calculates a difference between a phase angle calculated based on the constellation positions of the data of at least four points and a reference phase angle, and rotates the phase angle so that a difference between the phase angle and the reference phase angle becomes substantially zero (0).

On the other hand, a reception synchronization control device according to the present invention controls reception synchronization of a demodulator that demodulates a signal transmitted by a phase modulation, wherein the reception synchronization control device includes a unit that detects signal levels of the demodulated signals; a unit that obtains a layout state of the demodulated signals on the coordinates plane surface, based on the detected signal levels; a unit that specifies constellation positions of the demodulated signals, based on the layout state of the demodulated signals; a unit that calculates a difference between a phase angle of the demodulated signals calculated based on the specified constellation positions and a reference phase angle that becomes a phase reference; and a unit that controls the demodulator so that the phases of the demodulated signals are rotated to offset the difference.

On the other hand, a reception synchronization control method according to the present invention is a method of controlling a reception of analog demodulated signals to be synchronized in demodulating the analog demodulated signals of at least two channels obtained by receiving a signal transmitted by a phase modulation, the method including detecting signal levels of demodulated signals sampled from the analog demodulated signals of at least two channels; specifying constellation positions of plural kinds of data contained in the sampled demodulated signals, when displaying polar coordinates of the sampled demodulated signals based on the detected signal levels; and calculating a difference between a phase angle calculated based on the constellation positions of the specified plural kinds of data and a reference phase angle, thereby controlling a difference between the phase angle and the reference phase angle to be within a predetermined range.

Preferably, in the reception synchronization control method according to the present invention, in specifying the constellation positions of plural kinds of data, data of at least four points corresponding to the sampled demodulated signals of a highest appearance frequency are extracted from the sampled demodulated signals displayed on the display screen of the polar coordinates, thereby specifying constellation positions of the data of at least four points.

More preferably, in the reception synchronization control method according to the present invention, in controlling the difference between the phase angle and the reference phase angle, the data of at least four points are shifted so that a constellation position of one data among the data of at least four points coincides with a reference point within the display surface of the polar coordinates, a difference between a phase angle calculated based on the constellation positions of the data of at least four points and a reference phase angle is calculated, and the phase angle is rotated so that a difference between the phase angle and the reference phase angle becomes substantially zero.

On the other hand, the present invention provides a program used when receiving a signal transmitted by a phase modulation and demodulating the received signal into analog demodulated signals of at least two channels, thereby establishing reception synchronization of the analog demodulated signals, the program making a computer detect signal levels of demodulated signals sampled from the analog demodulated signals of at least two channels; specify constellation positions of plural kinds of data contained in the sampled demodulated signals, when displaying polar coordinates of the sampled demodulated signals based on the detected signal levels; and calculate a difference between a phase angle calculated based on the constellation positions of the specified plural kinds of data and a reference phase angle, thereby controlling the phase angle so that a difference between the phase angle and the reference phase angle is within a predetermined range.

In summary, according to the present invention, in a radio communication apparatus such as a cellular phone, a demodulator receives a phase-modulated signal of digital data according to a phase modulation, and demodulates the received signal into demodulated signals (for example, analog demodulated signals of plural channels), and the radio communication apparatus extracts sampled demodulated signals and detects signal levels of the extracted sampled demodulated signals. When coordinates of the sampled demodulated signals are displayed based on the detected signal levels, the radio communication apparatus specifies constellation positions of plural kinds of data (for example, digital data of four points each of which has a phase difference of 90 degrees from the phase of the adjacent point). Further, the radio communication apparatus calculates a difference between a phase angle calculated based on the specified constellation positions of plural kinds of data and a reference phase angle, thereby controlling a phase angle so that a difference between the phase angle and the reference phase angle is within a predetermined range. With this arrangement, reception synchronization of demodulated signals is finally established.

Therefore, according to the present invention, in carrying out the adjustment test of a reception card within a radio communication apparatus, the operator does not need to continually monitor a state of reception synchronization of a reception card using an oscilloscope or the like, but the constellation position specifier or the like specifies constellation positions of plural kinds of data, and the apparatus rotation controls the phase angle based on the constellation positions, thereby confirming whether or not the reception is synchronized. Accordingly, the state of reception synchronization of the demodulated signals can be easily established in a short time in all frequencies used. Further, the signal level detector or the like automatically detects signal levels, and the apparatus displays the polar coordinates of plural kinds of data, based on the signal levels. Consequently, no variation in the adjustment test carried out by the operator occurs, and the quality of the state of reception synchronization can be improved.

BRIEF DESCRIPTION OF THE DRAWINGS

The above object and features of the present invention will become more apparent from the following description of some preferred embodiments with reference to the accompanying drawings, wherein:

FIG. 4(a) shows a schematic flowchart of a process of the signal level detector FIG. 4(b) shows a state of detecting a signal level extracted by a sampling process of analog signals; and FIG. 4(c) shows a state of specifying constellation positions of digital data;

FIG. 11 is a schematic diagram showing a detailed example of a data phase angle difference adjustment process according to one embodiment of the present invention.

DESCRIPTION OF THE PREFERRED EMBODIMENTS

Configurations and operations of preferred embodiments of the present invention will be explained below with reference to the accompanying drawings (FIG. 2 to FIG. 11).

Figure 1:
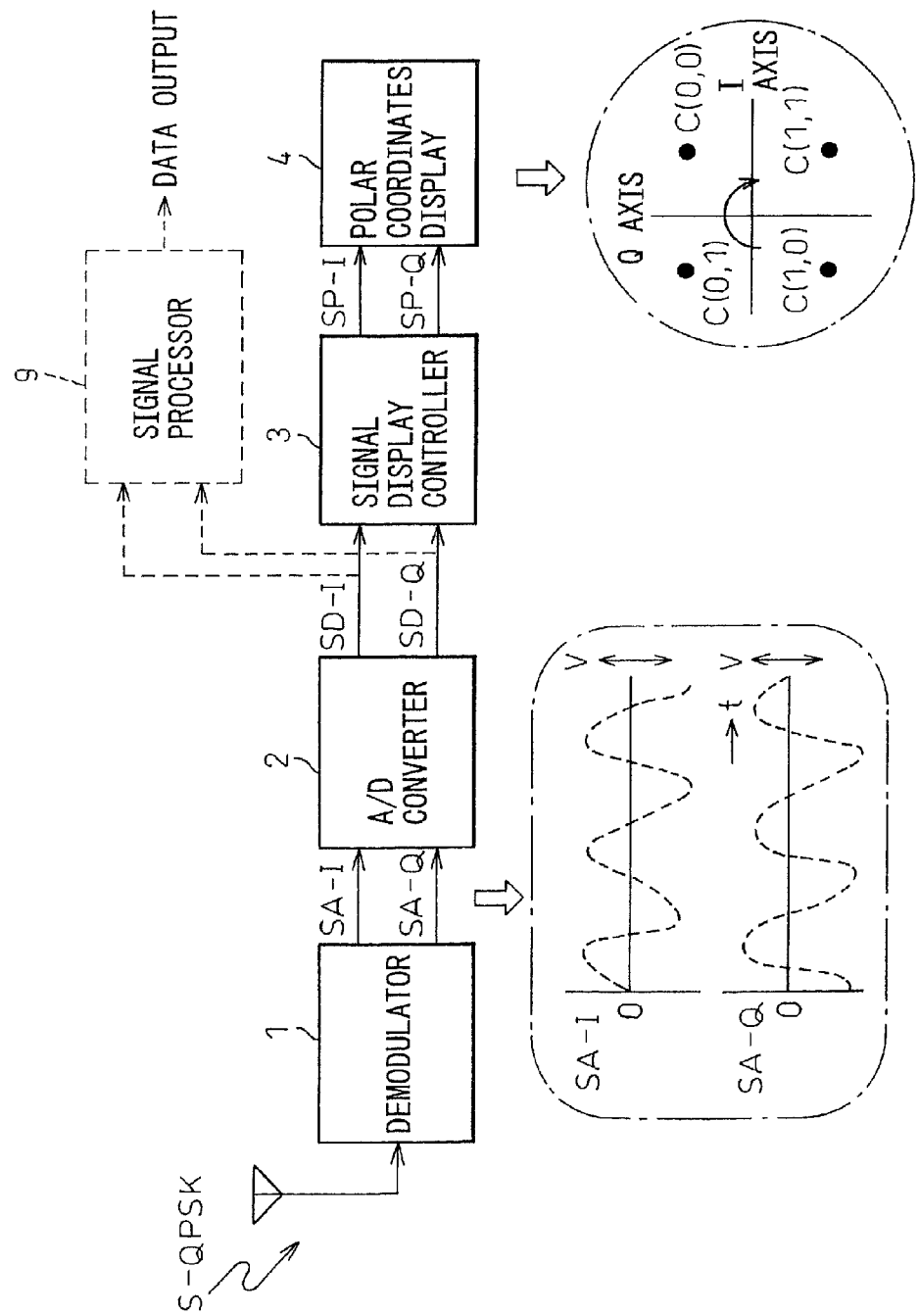
FIG. 1 is a block diagram showing a configuration of a reception card testing device according to a conventional reception synchronization establishing method.
Figure 2:
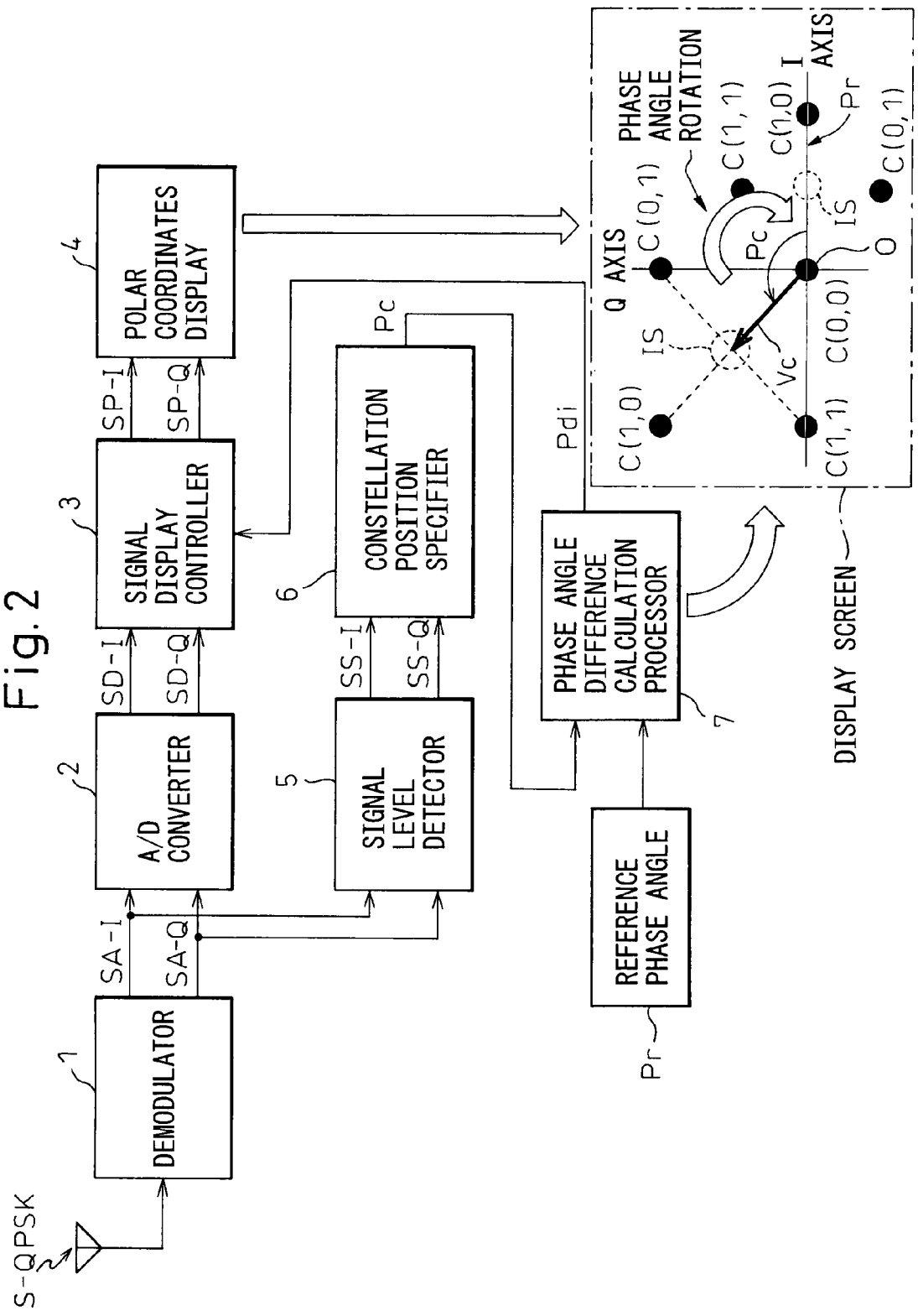
FIG. 2 is a block diagram showing a configuration of a reception synchronization control device according to one embodiment of the present invention.

FIG. 2 is a block diagram showing a configuration of a reception synchronization control device according to one embodiment of the present invention. FIG. 2 shows a simplified configuration of a reception synchronization control device according to the embodiment applied at the time of carrying out an adjustment test of a reception card within a radio communication device such as a cellular phone. In the following explanation, constituent elements similar to those mentioned before are represented by using the same reference numerals.

The reception synchronization control device according to the embodiment shown in FIG. 2 includes a demodulator 1 that receives a transmitted phase-modulated signal S-QPSK modulated by a digital data phase modulation such as QPSK modulation, and demodulates the received phase-modulated signal S-QPSK into two-channel analog demodulated signals SA-I and SA-Q. The reception synchronization control device further includes an analog/digital converter 2 that converts the analog demodulated signals SA-I and SA-Q output from the demodulator 1 into digital demodulated signals SD-I and SD-Q. The analog demodulated signals SA-I and SA-Q output from the demodulator 1 are substantially cyclical two-channel signals in a mutually orthogonal phase relationship.

Further, in the reception synchronization control device according to the embodiment shown in FIG. 2, an oscilloscope or the like is provided at the output of the analog/digital converter 2 within a reception card, to monitor whether or not the reception card is reception synchronized. This oscilloscope includes a signal display controller 3 and a polar coordinates display 4, and has a function of displaying the polar coordinates of the digital demodulated signals SD-I and SD-Q output from the analog/digital converter 2. The signal display controller 3 processes the digital demodulated signals SD-I and SD-Q, and generates signal data SP-I and SP-Q to display the polar coordinates of the digital demodulated signals. The polar coordinates display 4, displays the signal data SP-I and SP-Q output from the signal display controller 3 onto a display screen of the polar coordinates display 4.

On the display screen of the polar coordinates display 4, four digital data points C (0, 0), C (0, 1), C (1, 0), and C (1, 1) are displayed respectively (shown by black circles) in the I-Q coordinate space. Each of four digital data points has a phase difference of 90 degrees from the phase of the adjacent point respectively. Positions of the four point digital data displayed on the display screen change with time due to noise, etc. Therefore, the digital data are displayed to have a certain spread.

The reception synchronization control device according to the embodiment shown in FIG. 2 further includes a signal level detector 5 connected to the output of the demodulator 1; a constellation position specifier 6 connected to the output of the signal level detector 5; and a phase angle difference calculation processor 7 connected to the output of the constellation position specifier 6. Alternatively, the signal level detector 5 can be connected to the output of the analog/digital converter 2.

The signal level detector 5 has a function of sampling the two-channel analog demodulated signals SA-I and SA-Q output from the demodulator 1, at a predetermined time interval, and detecting signal levels of plural sampled demodulated signals SS-I and SS-Q extracted by the sampling process. Information showing the detected signal levels of plural sampled demodulated signals SS-I and SS-Q is transferred to the constellation position specifier 6.

The constellation position specifier 6 has a function of extracting four point digital data corresponding to a sampled demodulated signal having a highest appearance frequency (four point digital data most densely appearing on the display screen), from among plural sampled demodulated signal SS-I and SS-Q, based on a signal level detected by the signal level detector 5. Further, the constellation position specifier 6 specifies constellation positions of the extracted four point digital data.

The phase angle difference calculation processor 7 has a function of calculating a difference (Pdi) between a phase angle Pc of four point digital data calculated based on the constellation positions of digital data having high appearance frequency extracted by the constellation position specifier 6, and a reference phase angle Pr set in advance (zero degree, for example). In the present embodiment, the phase angle Pc of four point digital data is defined as an angle shown by a vector Vc between a position of an intersection IS of two diagonal lines each formed by digital data at two points among four digital data points, and a reference point (the origin O, for example), as shown in enlargement at the right lower part of the display screen in FIG. 2.

The phase angle difference calculation processor 7 shifts four point digital data so that the constellation position of one digital data (the digital data C (0, 0), for example) out of the four point digital data coincides with the reference point (the origin O, for example). Further, the phase angle difference calculation processor 7 calculates a phase angle difference between the phase angle Pc calculated based on the constellation positions of the shifted four point digital data, and the reference phase angle Pr. Further, the phase angle difference calculation processor 7 adjusts the phase angle Pc by rotating the phase angle Pc (or four points digital data) around a particular signal point (the digital data C (0, 0) for instance) of digital data having a highest appearance frequency so that the phase angle difference is set within a predetermined range (for example, within ±five degrees from the reference phase angle Pr). The phase angle Pc can be accurately adjusted by the control carried out by the phase angle difference calculation processor 7. Accordingly, phases of the four point digital data are locked to phases in the process carried out by the demodulator within the reception card, and the reception synchronization of the two-channel analog demodulated signals can be established.

As described later, the functions of the signal level detector 5, the constellation position specifier 6, and the phase angle difference calculation processor 7 can be achieved when a CPU (Central Processing Unit) of a general-purpose personal computer executes various kinds of programs (software). Therefore, in the reception synchronization control device according to the embodiment shown in FIG. 2, reception synchronization can be established by software, without particularly preparing dedicated hardware to adjust reception synchronization of analog demodulated signals.

According to the embodiment shown in FIG. 2, in carrying out the adjustment test of a reception card within a radio communication device, constant monitoring of a reception synchronization state of a reception cared by an operator through the polar coordinates displayed on the oscilloscope is not required. Instead, the phase angle Pc of digital data is rotationally controlled by the phase angle difference calculation processor 7, so that a phase angle difference Pdi between the phase angle Pc calculated by the phase angle difference calculation processor 7 and the reference phase angle Pr is set within a predetermined range, based on the constellation positions of plural data specified by the constellation position specifier 6, thereby confirming whether or not reception is synchronized. Therefore, a reception synchronization state of analog demodulated signals can be easily established in a short time in all frequencies used.

Figure 3:
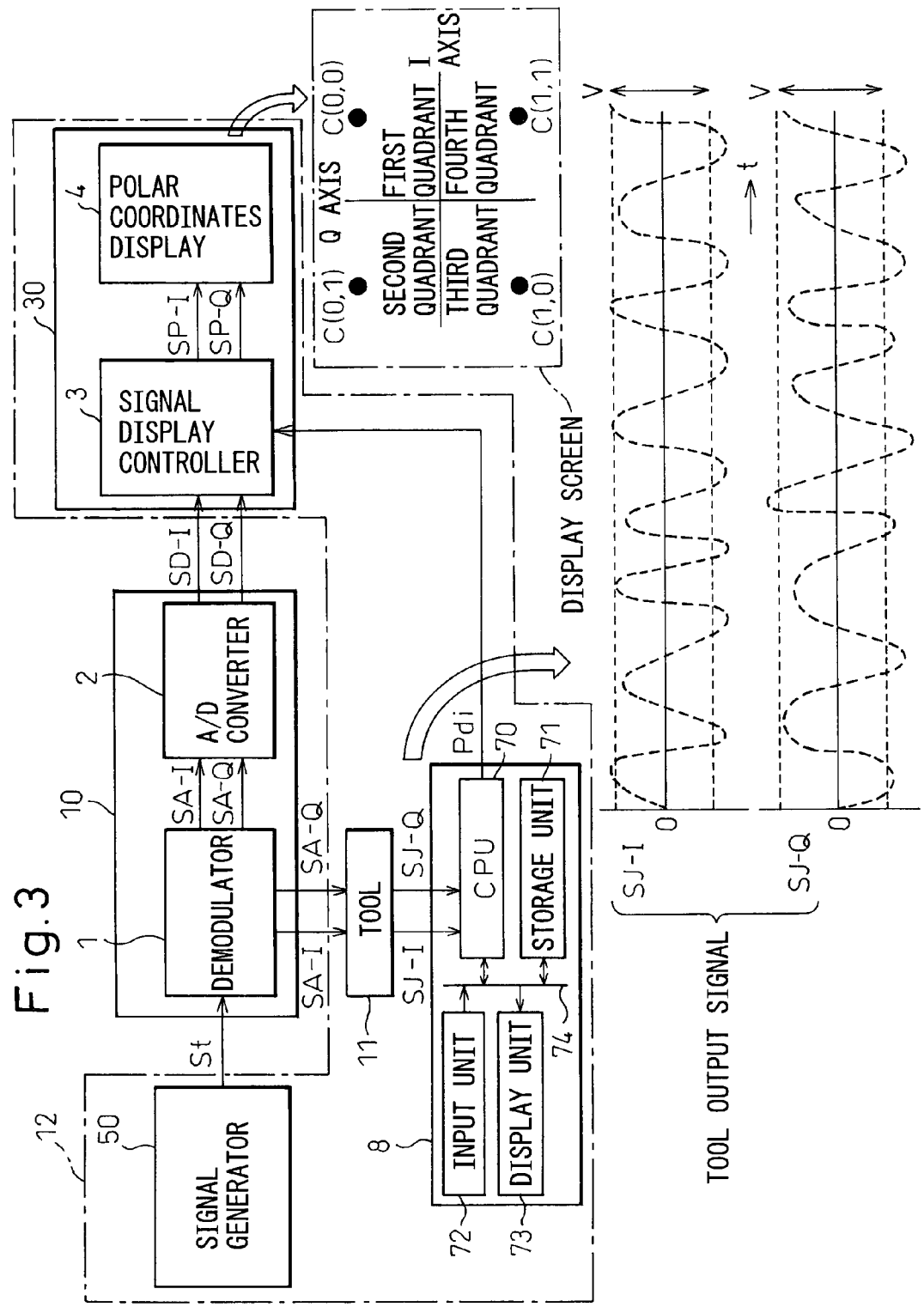
FIG. 3 is a block diagram showing an example in which the reception synchronization control device according to one embodiment of the present invention is applied to a reception card testing device.

FIG. 3 is a block diagram showing an example of the reception synchronization device according to one embodiment of the present invention that is applied to a reception card testing device. In FIG. 3, a configuration of the reception card testing device 12 carrying out an adjustment test of the reception card as a single unit, in which the embodiment shown in FIG. 2 is applied, is simplified.

In the reception card testing device 12 shown in FIG. 3, a signal generator 50 that generates a test signal St to carry out the adjustment test of the reception card 10 is provided. The signal generator 50 generates a test signal St substantially equivalent to a phase-modulated signal transmitted by the phase modulation such as the QPSK modulation, and supplies the test signal St to the reception card 10. The demodulator 1 and the analog/digital converter 2 similar to those of the embodiment shown in FIG. 2 are mounted on the reception card 10.

Further, in the reception card testing device 12 shown in FIG. 3, an oscilloscope 30 that monitors whether or not the reception card 10 is reception synchronized is provided, at the output of the analog/digital converter 2 within the reception card 10. The oscilloscope 30 includes the signal display controller 3 and the polar coordinates display 4, and has a function of displaying polar coordinates of the digital demodulated signals SD-I and SD-Q output from the analog/digital converter 2.

On the display screen of the polar coordinates display 30, four point digital data C (0, 0), C (0, 1), C (1, 0), and C (1, 1), each of which has a phase difference of 90 degrees from the phase of the adjacent point, are displayed in the first quadrant to the fourth quadrant of the I-Q coordinate space, including the I axis and the Q axis, respectively. The four points digital data displayed in the polar coordinates display 4 are not actually clearly displayed as shown in FIG. 3 due to noise and the like, and are displayed in scattering within a certain range around a certain point (black circles in FIG. 3, for example). The signal display controller 3 determines a position at which individual digital data should be displayed.

Further, in the reception card testing device 12 shown in FIG. 3, a tool 11 having a terminal to fetch the two-channel analog demodulated signals SA-I and SA-Q from the demodulator 1 within the reception card 10 is provided. A personal computer 8 is connected to the output of the tool 11. Tool output signals SJ-I and SJ-Q output from the tool 11 corresponding to the analog demodulated signals SA-I and SA-Q are substantially cyclical two-channel signals mutually in an orthogonal phase relationship, as shown in enlargement at the lower part in FIG. 3. The tool output signals SJ-I and SJ-Q are expressed as a continuous change of an output voltage V versus time (t), and are output to the personal computer 8.

The personal computer 8 includes a CPU 70 that carries out various kinds of process to the tool output signals SJ-I and SJ-Q supplied from the tool 11. For example, the CPU 70 specifies constellation positions of four point digital data, and calculates a phase angle difference (Pdi) between the phase angle Pc and the reference phase angle Pr. Further, CPU 70 processes data input by the operator by operating an input unit 72. The personal computer 8 also has a storage unit (memory) 71 that stores various kinds of data including a program (software) to execute a reception synchronization control; and a display unit 73 that displays data input by operating the input unit 72 and displays a state of reception of a signal by the reception card 10. The CPU 70, the storage unit 71, the input unit 72, and the display unit 73 are connected to each other via a bus 74.

The storage unit 71 includes a ROM (Read-only Memory) or RAM (Random Access Memory). Instead of the storage unit 71 as shown in FIG. 3, a ROM or RAM embedded in the CPU 70 can be also used.

In the example shown in FIG. 3, preferably the CPU 70 achieves the functions of the signal level detector 5, the constellation position specifier 6, and the phase angle difference calculation processor 7 as shown in FIG. 2. More specifically, the CPU 70 reads a program to execute the reception synchronization stored in the ROM and various data stored in the RAM necessary to execute the program, in the storage unit 71 shown in FIG. 3, and executes the program, thereby achieving the functions of the constellation position specifier 6 and the phase angle difference calculation processor 7.

Figure 4:
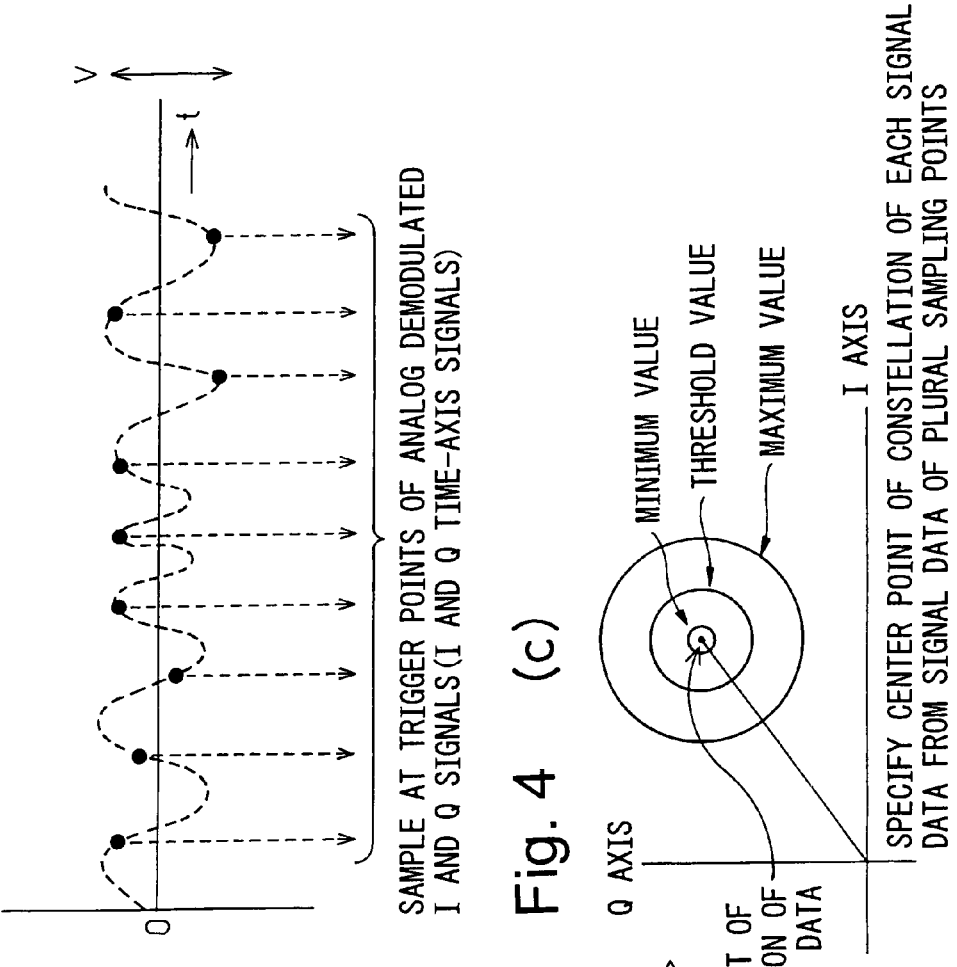
FIGS. 4(a)-(c) illustrate the operation of the main parts of the reception card testing device shown in FIG. 3.

FIG. 4 is a diagram for explaining the signal processing operation of the main part of the reception card testing device shown in FIG. 3. More specifically, portion (a) of FIG. 4 shows a schematic flowchart of a process executed by the CPU 70 to achieve the functions of the signal level detector 5 and the constellation position specifier 6 shown in FIG. 2 respectively. Portion (b) of FIG. 4 and portion (c) of FIG. 4 show a state of detecting a signal level extracted by the sampling process of analog demodulated signals (that is, the two-channel analog demodulated I, Q signals), and a state of specifying constellation positions of digital data, respectively.

In carrying out the adjustment test of a reception card to be tested, a sampling of continuous analog demodulated signals I and Q (corresponding to the tool output signals SJ-I and SJ-Q) taken out via the tool 11 from the demodulator 1 within the reception card is carried out at plural trigger points (sampling points) on a preset time axis, as shown at step S40 of the flowchart in portion (a) of FIG. 4. The analog demodulated signals I and Q are also called I and Q time axis signals, as the analog demodulated signals I and Q are expressed by a continuous change of the output voltage V versus time t, as shown in portion (b) of FIG. 4. To simplify the explanation, only one of the two-channel analog demodulated signals I and Q is shown in FIG. 4.

When the sampling of the analog demodulated signals is carried out, values of the output voltage V (voltage levels of black circle parts in portion (b) of FIG. 4) of plural sampled demodulated signals (black circles in portion (b) of FIG. 4) extracted at the plural trigger points are detected as signal levels of plural sampled demodulated signals.

As shown at step S41 of the flowchart in portion (a) of FIG. 4, constellation positions of the digital data are specified by estimation from the plural sampled demodulated signals, based on the signal level detected at step S40.

The plural demodulated data or sampled demodulated data output from the demodulator 1 are disposed in scatter around a certain point in the I-Q coordinate space. As shown in portion (c) of FIG. 4, when the distribution state of plural signal data disposed in the I-Q coordinate space is statistically processed, a maximum value, a minimum value, and a threshold value of variations of the plural signal data can be determined. A position of the center of a range encircled by the threshold value determined in this way is estimated as a constellation center point of each signal data. The "threshold value" is a value set in advance as an upper value of a variation of the plural signal data that can be statistically extracted, to carry out the process of specifying a center point of constellation of each signal data in a short amount of time. In other words, the center point of constellation is specified based on four point digital data (four point digital data appearing most densely on the display screen), by extracting these four point digital data corresponding to signal data having a highest appearance frequency among the plural signal data disposed in the I-Q coordinate space.

Figure 5:
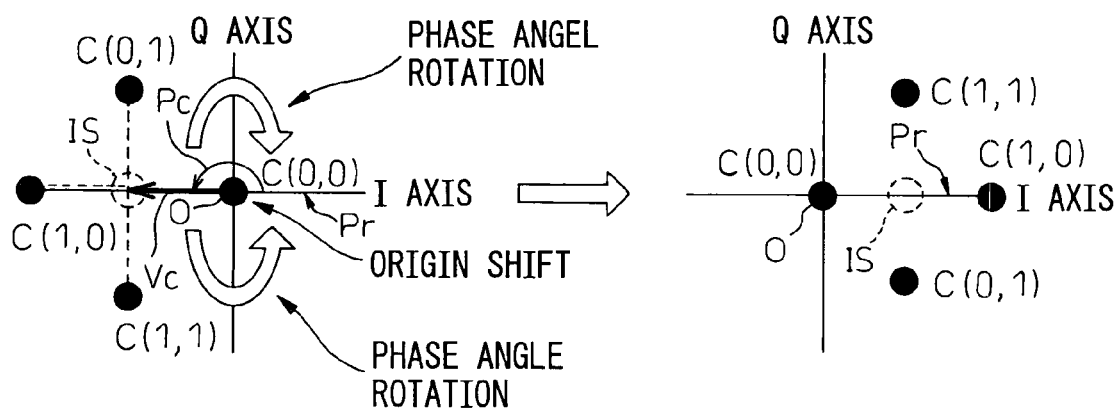
FIG. 5 is a schematic diagram of a state of calculating a phase angle difference of data of four points in the reception card testing device shown in FIG. 3.

FIG. 5 is a schematic diagram showing a state of calculating a phase angle difference of four point data of versus a reference phase angle in the reception card testing device shown in FIG. 3. FIG. 5 shows a state of calculating a difference between the phase angle Pc calculated based on the constellation positions of specified four point digital data as shown in portion (c) of FIG. 4 and a preset reference phase angle Pr (zero degree, for example). As described above, the phase angle Pc of the four point digital data is defined as the angle shown by the vector Vc between a position of the intersection IS of two diagonal lines each formed by digital data at two points among the digital data at four points, and the reference point (the origin O, for example).

As described above, when constellation positions of four point digital data are specified, the four point digital data are shifted so that a constellation position of one digital data (the digital data C (0, 0), for example) out of the four point digital data C (0, 0), C (0, 1), C (1, 0), and C (1, 1) coincides with the reference point (the origin, for example). Next, the phase angle Pc is calculated based on the constellation positions of the shifted four point digital data. In the example shown in FIG. 5, the phase angle Pc is 180 degrees. A phase angle difference between the calculated phase angle Pc and the reference phase angle Pr is then calculated. The four point digital data are rotated by a certain angle around the reference signal point as the axis so that the phase angle difference is set within the predetermined range. In the example shown at the right side in FIG. 5, the digital data are rotated by 180 degrees from the position shown at the left side of FIG. 5. With this arrangement, the phase angle of the demodulated digital data can be adjusted so that the phase angle Pc substantially coincides with the reference phase angle Pr. Based on the phase angle adjusted in this way, the phase of the four point digital data are locked to the phase at the demodulation time within the reception card shown in FIG. 3, and the reception synchronization of the two-channel analog demodulated signals I and Q can be established.

Figure 6:
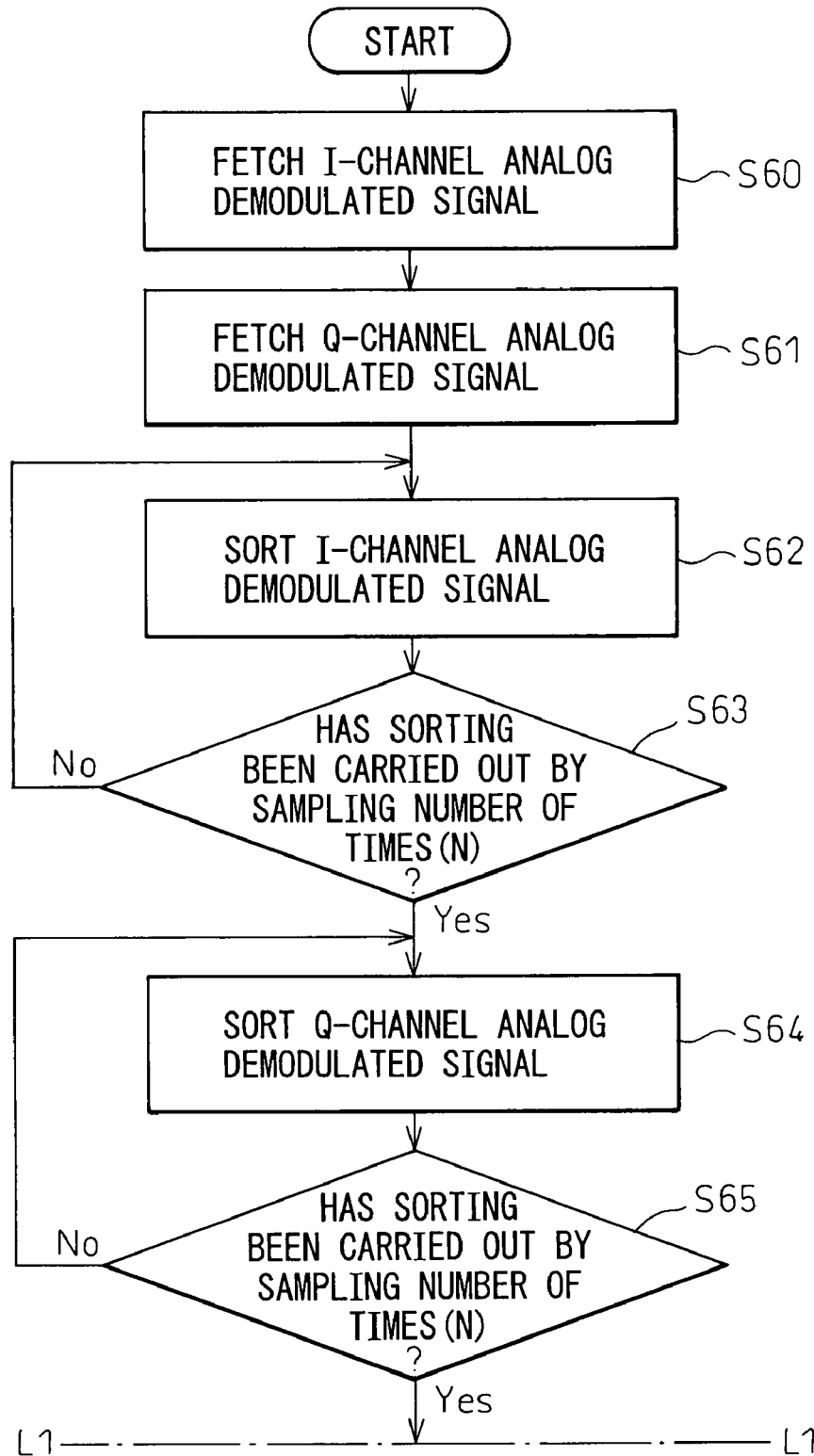
FIG. 6 is a flowchart (part 1) for explaining a processing flow of specifying constellation positions of original data from analog demodulated signals by a reception synchronization control according to one embodiment of the present invention.
Figure 7:
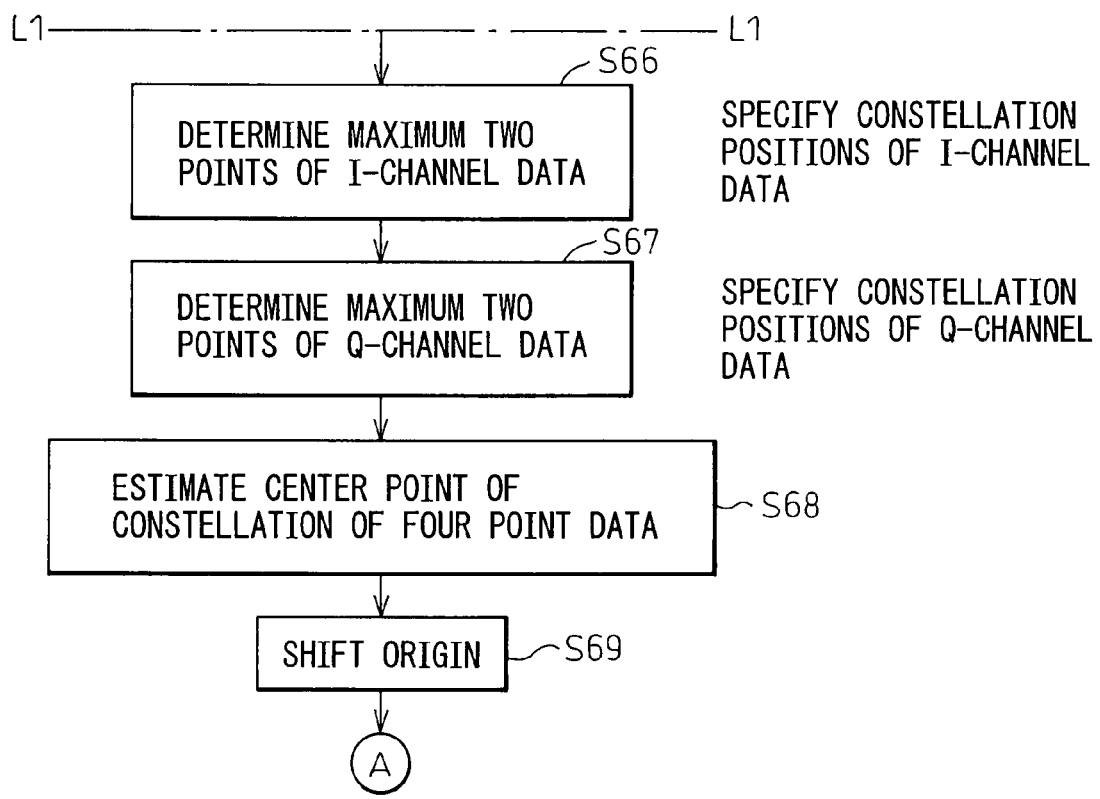
FIG. 7 is a flowchart (part 2) for explaining a processing flow of specifying constellation positions of original data from analog demodulated signals by a reception synchronization control according to one embodiment of the present invention.

FIGS. 6 and 7 are flowcharts for explaining a processing flow of specifying constellation positions of original data from analog demodulated signals by a reception synchronization control according to the present embodiment. A processing flow of specifying constellation positions of the original data from two-channel analog demodulated signals by operating the CPU shown in FIG. 3 is explained here, based on the detailed flowcharts shown in FIG. 6 and FIG. 7. The flowcharts of FIG. 6 and FIG. 7 are showing details of the processing flow shown in portion (a) of FIG. 4.

In executing the process of specifying the constellation positions of the original digital data from the two-channel analog demodulated signals obtained by demodulation from the reception card shown in FIG. 3, the CPU of the personal computer fetches, from the demodulator of the reception card 10, the two-channel analog demodulated signals, the analog demodulated signal of the one I channel and the analog demodulated signal of the other Q channel, mutually in the orthogonal phase relationship, as shown in at step S60 and step S61 shown in FIG. 6.

Next, at step S62, the CPU processes the two-channel analog demodulated signals using a filter or the like, to separate the analog demodulated signal of the I channel from the analog demodulated signal of the Q channel, thereby sorting the analog demodulated signal of the I channel.

At step S63, the CPU samples the analog demodulated signal of the I channel at predetermined time intervals by a predetermined sampling number of times N, in which N is a positive integer equal to or larger than 2. Based on this sampling, signal levels of the extracted plural sampled demodulated signals of the I channel are detected.

At step S64, the CPU processes the two-channel analog demodulated signals using a filter or the like, to separate the analog demodulated signal of the Q channel from the analog demodulated signal of the I channel, thereby sorting the analog demodulated signal of the Q channel.

At step S65, the CPU samples the analog demodulated signal of the Q channel at predetermined time intervals by the predetermined sampling number of times N. Based on this sampling, signal levels of the extracted plural sampled demodulated signals of the Q channel are detected.

At step S66 shown in FIG. 7, two points of maximum values (absolute values) among plural I channel signal data disposed in the I-Q coordinate space are determined. Digital data components on the I axis corresponding to these determined two points of maximum values are taken out to specify constellation positions of I channel signal data. Alternatively, digital data components on the I axis corresponding to signal data having a maximum appearance frequency value can be extracted from among the plural I channel signal data disposed in the I-Q coordinate space.

At step S67 in FIG. 7, two points of maximum values (absolute values) among plural Q channel signal data disposed in the I-Q coordinate space are determined. Digital data components on the Q axis corresponding to these determined two points of maximum values are taken out to specify constellation positions of Q channel signal data. Alternatively, digital data components on the Q axis corresponding to signal data having a maximum appearance frequency value can be extracted from among the plural Q channel signal data disposed in the I-Q coordinate space.

At step S68, a center point of each constellation of the four point digital data disposed in the I-Q coordinate space is estimated, based on the components of digital data on the Q axis and the components of digital data on the Q axis estimated at step S66 and step S67. The center point of each constellation of digital data estimated in this way is specified as the constellation position of each of the four point digital data.

Finally, at step S69, the four point digital data are shifted so that the constellation position of one digital data in the four point digital data coincides with the reference point, for example the origin in the I-Q coordinate space. This shifting process of the digital data are carried out as a prestage process to simplify the process of calculating a difference between the phase angle Pc and the reference phase angle Pr, that is a phase angle difference, as shown in FIG. 8 and FIG. 9 described later.

Figure 8:
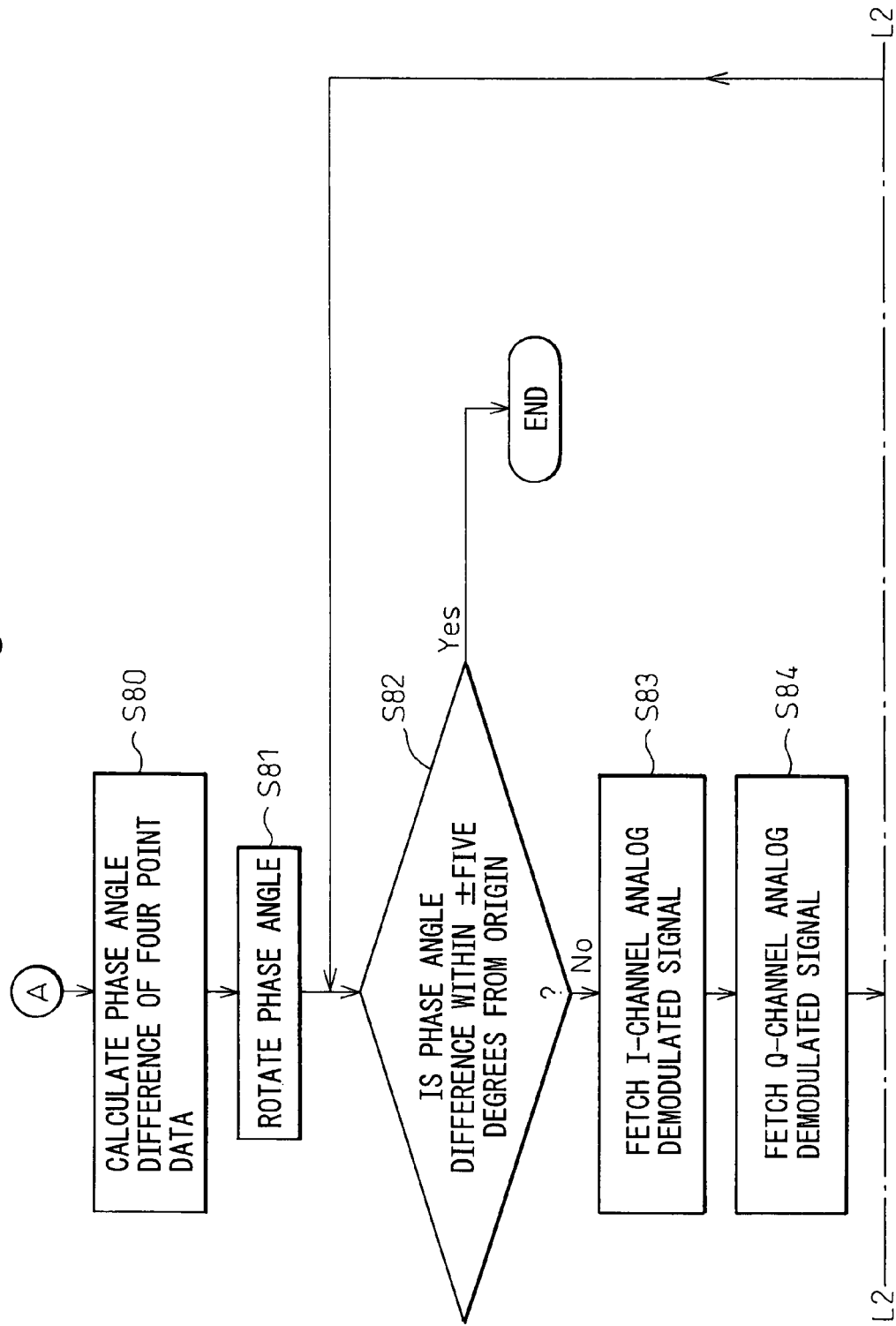
FIG. 8 is a flowchart (part 1) for explaining a processing flow of calculating and adjusting a phase angle difference of the original data by reception synchronization control according to one embodiment of the present invention.
Figure 9:
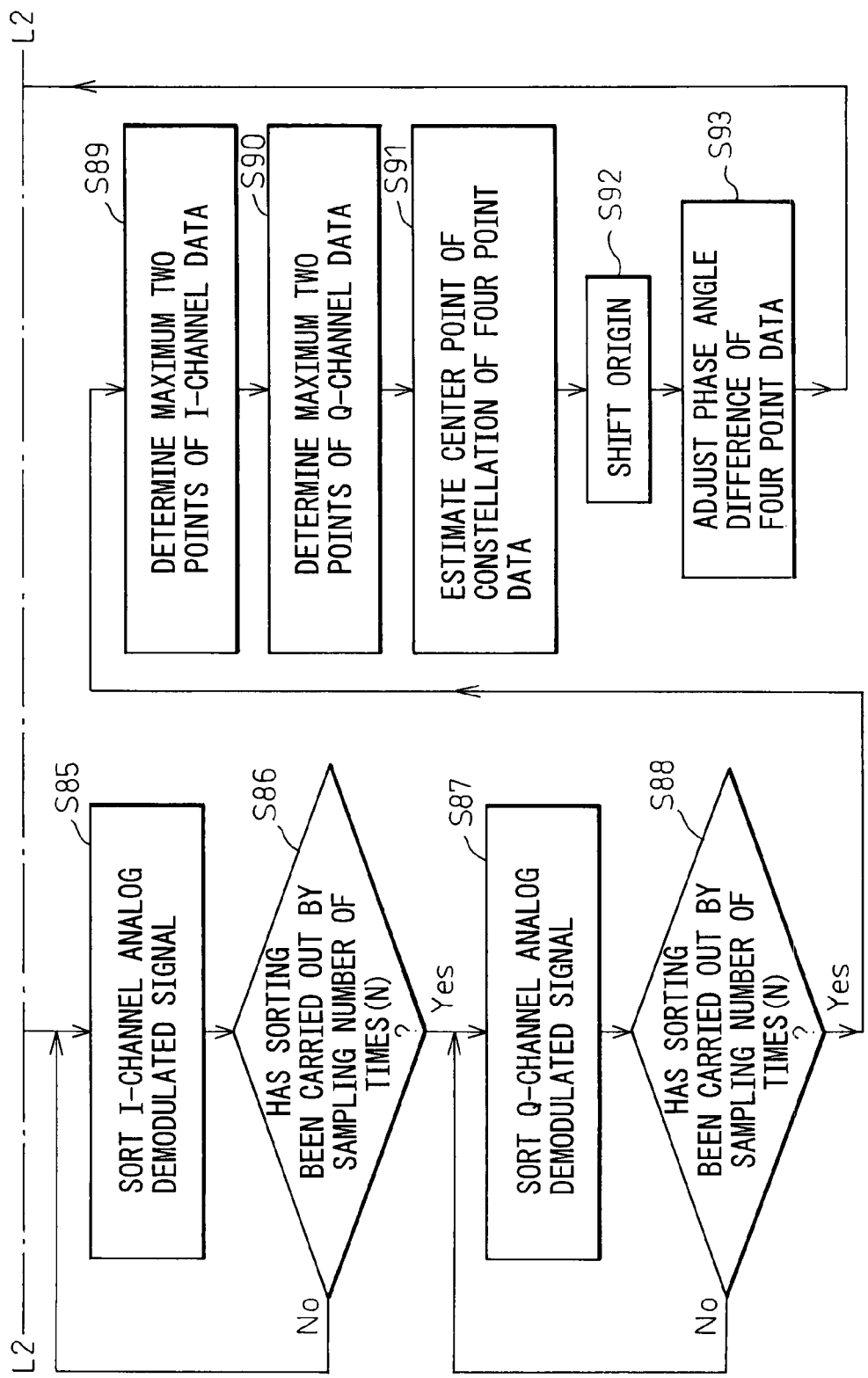
FIG. 9 is a flowchart (part 2) for explaining a processing flow of calculating and adjusting a phase angle difference of the original data by reception synchronization control according to one embodiment of the present invention.

FIGS. 8 and 9 are flowcharts for explaining a processing flow of calculating and adjusting a phase angle difference by reception synchronization control process according to the present embodiment. The processing flow of adjusting the phase of the digital data by calculating a phase angle difference of the four point digital data by operating the CPU shown in FIG. 3 is explained below based on the detailed flowcharts.

As shown in FIGS. 6 and 7 mentioned above, after carrying out the shifting process by specifying the constellation positions of the four point digital data, a phase angle difference of the four point digital data is calculated and adjusted. In this case, as shown at step S80 in FIG. 8, the phase angle Pc is calculated based on the four point digital data. Next, a phase angle difference between the phase angle Pc calculated in this way and the reference phase angle Pr (for example, 0 degree) is calculated.

Next, at step S81, a phase angle difference of the digital data is roughly adjusted, by rotating the phase angle Pc of the four point digital data by a certain angle, using the reference point (for example, the origin) as the axis, so that the phase angle difference calculated at step S80 is set within a predetermined range (for example, ±five degrees from the reference phase angle Pr).

Next, at step S82, it is determined whether or not the phase angle difference of digital data roughly adjusted at step S81 is actually within the range of ±five degrees from the reference phase angle Pr. When it is determined that the phase angle difference after the rough adjustment is within ±five degrees, the adjustment of the phase angle of the digital data is completed, and the processing flow shown in FIG. 8 and FIG. 9 ends.

On the other hand, when it is determined that the phase angle difference after the rough adjustment is not within ±five degrees, the process proceeds to step S83 and step S84, and the analog demodulated signal of the I channel and the analog demodulated signal of the Q channel are fetched again in a similar manner to that of the process at step S60 and step S61 described with reference to FIG. 6 above.

At step S85 and step S86 shown in FIG. 9, after the analog demodulated signal of the I channel is sorted, the analog demodulated signal of the I channel is sampled by the predetermined sampling number of times (N), and signal levels of the extracted plural sampled demodulated signals of the I channel are detected, in a process similar to that at step S62 and step S63.

At step S87 and step S88 shown in FIG. 9, after the analog demodulated signal of the Q channel is sorted, the analog demodulated signal of the Q channel is sampled by the predetermined sampling number of times (N), and signal levels of the extracted plural sampled demodulated signals of the Q channel are detected, in a process similar to that at step S64 and step S65.

At step S89 and step S90 shown in FIG. 9, two points of maximum values (absolute values) among plural I channel signal data disposed in the I-Q coordinate space are determined, similar to the process at step S66 and step S67 shown in FIG. 7. Digital data components on the I axis corresponding to these determined two points of maximum values are taken out. At the same time, two points of maximum values among plural Q channel signal data disposed in the I-Q coordinate space are determined, and digital data components on the Q axis corresponding to these determined two points of maximum values are taken out.

Further, at step S91 in FIG. 9, a center point of each constellation of the four point digital data disposed in the I-Q coordinate space is estimated, based on the components of digital data on the Q axis and the components of digital data on the I axis specified in a process similar to that at step S89 in FIG. 7.

At step S92 shown in FIG. 9, as in the process at step S69 shown in FIG. 7, the four point digital data are shifted so that the constellation position of one digital data in the four point digital data coincides with the reference point (for example, the origin), in the I-Q coordinate space.

Further, at step S93 in FIG. 9, the phase angle of the digital data is fine adjusted so that a phase angle difference of the four point digital data is set within ±five degrees.

The process at step S83 to S93 is repeatedly carried out until a phase angle difference of the four point digital data is finally set within the range of ±five degrees, that is, until the adjustment of the phase angle Pc of the digital data is completed and the reception synchronization is established.

Figure 10:
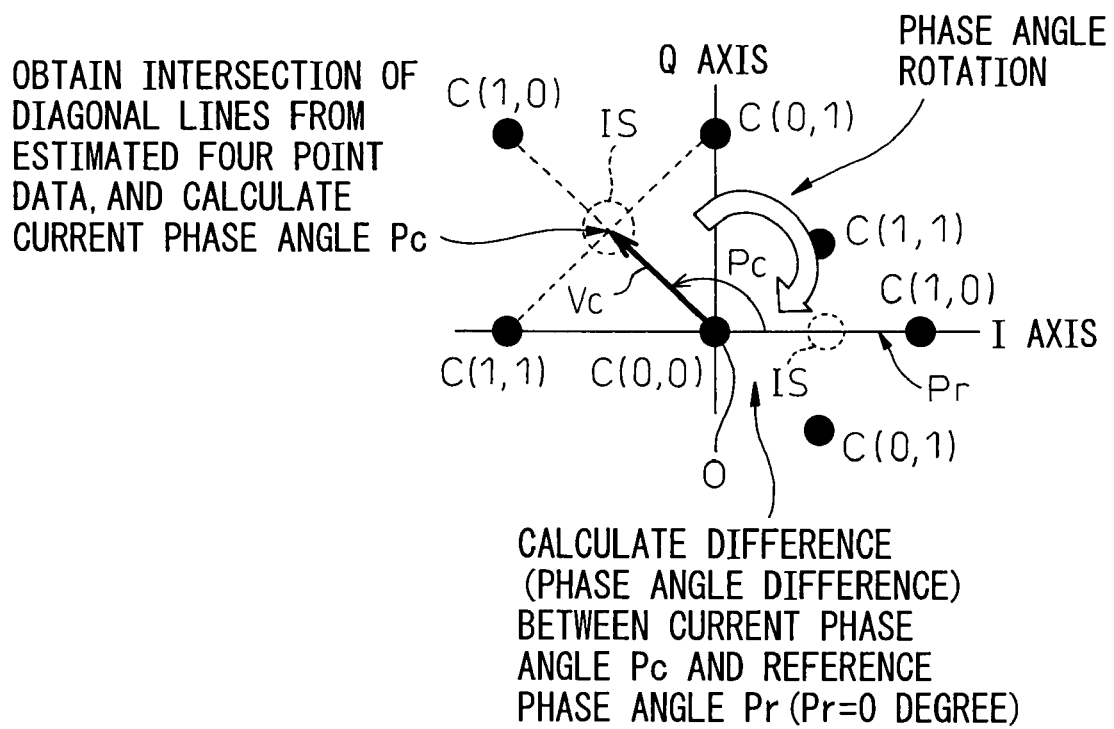
FIG. 10 is a schematic diagram showing a detailed example of a data phase angle difference calculation process according to one embodiment of the present invention.

FIG. 10 is a schematic diagram showing a detailed example of a data phase angle difference calculation process according to the present embodiment, and FIG. 11 is a schematic diagram showing a detailed example of a data phase angle difference adjustment process according to the present embodiment.

More specifically, FIG. 10 shows a schematic diagram for explaining one example of the algorithm of the phase angle difference calculation process as digital data relevant to the reception synchronization control process in the I-Q coordinate space according to the present embodiment. On the other hand, portion (a) of FIG. 11 shows a flowchart schematically describing the processing flow shown in FIG. 8 and FIG. 9 for reference. Portion (b) of FIG. 11 shows a schematic diagram for explaining one example of the algorithm of the phase angle difference adjustment process as digital data relevant to the reception synchronization control process in the I-Q coordinate space according to the present embodiment. The phase angle difference calculation process and the phase angle difference adjustment process of the four point digital data displayed in the I-Q coordinate space are carried out, to establish a state of the reception synchronization of the two-channel analog demodulated signals obtained by receiving the phase-modulated signals transmitted by the QPSK modulation.

The algorithm of the phase angle difference calculation process of the digital data as shown in FIG. 10 is described as shown in (1) to (4) below.

(1) The two-channel analog demodulated signals of the I component and the Q component obtained by receiving the phase-modulated signal by the QPSK modulation are data continuous versus the time axis. Therefore, signal levels of plural sampled demodulated signals extracted at plural trigger points are detected, by sampling the two-channel analog demodulated signals.

(2) Plural sampled demodulated signals are disposed in the polar coordinates, based on the detected signal levels. The original four point digital data C (0, 0), C (0, 1), C (1, 0), and C (1, 1) are estimated from the signal data of the plural sampled demodulated signals disposed in the I-Q coordinate space.

(3) An intersection IS of a diagonal line connecting between C (0, 0) and C (1, 0) and a diagonal line connecting between C (1, 1) and C (1, 1) is obtained from the estimated four point digital data, and the phase angle Pc shown by the vector Vc between the position of the intersection IS and the origin O of the I-Q coordinate space is calculated. In this case, the phase angle Pc is described as the following function (func).

Iave=func (Imax, Imin, a sampling number of times of the I-channel signal data)

Qave=func (Qmax, Qmin, a sampling number of times of the Q-channel signal data)

∴ the phase angle Pc=func (Iave, Qave)

In the above, symbols within the above parentheses show parameters that determine the function (func). For example, Imax/Qmax and Imin/Qmin show a maximum value and a minimum value of the I component and the Q component of variations of plural signal data disposed in the I-Q coordinate space respectively. On the other hand, Iave shows signal data having a highest appearance frequency in the I-channel signal data, and Qave shows signal data having a highest appearance frequency in the Q-channel signal data.

(4) A phase difference between the calculated phase angle Pc (for example, 135 degrees) and the reference phase angle Pr (for example, 0 degree) is calculated. In this case, the phase angle difference is 135 degrees. The phase angle of the four point digital data is rotated by a certain angle, using the origin as the axis. In the example of FIG. 10, the four point digital data are rotated by 135 degrees, which is the phase angle difference between Pc and Pr.

On the other hand, the algorithm of the phase angle difference adjustment process of the digital data shown in portion (b) of FIG. 11 is described as shown in (1) to (3) below.

(1) As shown in FIG. 10, after the digital data are rotated by a predetermined angle, the phase angle difference between the phase angle Pc of the digital data and the reference phase angle Pr is set as a next-setting phase angle difference. The next-setting phase angle difference is described as:

The next-setting phase angle difference=func (Iave, Qave)−func (Itarget, Qtarget)

In the above, Itarget and Qtarget show the I-channel signal data and the Q-channel signal data having a final target phase angle (for example, 0 degree).

(2) A difference between the phase angle Pc and the reference phase angle Pr (or between the phase angle Pc and the final target phase angle) is calculated based on the next-setting phase angle difference, thereby repeating the process of rotating the digital data so that there is no phase angle difference between the phase angle Pc and the reference phase angle Pr. In other words, the phase angle difference calculation process and the phase angle difference adjustment process of digital data are executed to minimize the phase angle difference, by repeating the processes of "calculating a difference between the phase angle Pc and the reference phase angle Pr" and "rotating the digital data" and so on. This process of rotating the digital data by calculating a phase angle difference between the phase angle Pc and the reference phase angle Pr based on the next-setting phase angle difference is repeatedly executed until the phase angle Pc substantially coincides with the reference phase angle Pr, that is, until when the phase angle difference is accommodated within a predetermined range.

(3) When the reception card testing device is used to carry out the adjustment test of the reception synchronization of the reception card, a phase of a test signal generated by the signal generator can be calculated in advance, and the reference phase angle is set based on the phase of this test signal.

In summary, as shown by the flowchart in portion (a) of FIG. 11, at step S110, a phase angle difference of the digital data is roughly adjusted by the algorithm shown in FIG. 10, and, at step S111, the phase angle difference of the digital data is fine adjusted by the algorithm shown in portion (b) of FIG. 11.

Finally, at step S112 in portion (a) of FIG. 11, the phases of the four point digital data are locked based on the phase angle corresponding to the phase angle difference adjustment position shown in portion (b) of FIG. 11, thereby establishing the reception synchronization of the two-channel analog demodulates signals.

With regard to an industrial applicability of the present invention, the present invention can be applied to a reception card testing device in a radio communication device such as a cellular phone. The radio communication device receives a phase-modulated signal of digital data transmitted by a phase modulation such as the QPSK modulation, and demodulates the received phase-modulated signal into analog demodulated signals of plural channels. The reception card testing device carries out an adjustment test of a reception card mounted with a demodulator of a cellular phone or the like, and confirms whether or not the reception of the analog demodulated signals is synchronized.

The invention claimed is:

1. A reception synchronization control device having a demodulator that receives a phase modulated signal and demodulates the received signal into analog demodulated signals of at least two channels, comprising:

a signal level detector that detects signal levels of demodulated signals from the analog demodulated signals of at least two channels obtained by receiving a signal transmitted by a phase modulation;

a constellation position specifier that extracts sampled demodulated signals displayed on polar coordinates based on the detected signal levels, and specifies constellation positions of a plurality of data contained in the sampled demodulated signals on the polar coordinates; and a phase angle difference calculation processor that calculates a phase angle difference between a phase angle calculated based on the constellation positions of the specified data and a reference phase angle, and the phase angle difference calculation processor establishes reception synchronization of the analog demodulated signals by controlling the phase angle based on the constellation positions of the specified data so that a difference between the phase angle and the reference phase is within a predetermined range.

2. The reception synchronization control device according to claim 1, wherein the phase angle difference calculation processor extracts data of at least four points corresponding to the sampled demodulated signals of a highest appearance frequency from the demodulated signals displayed on a display screen of the polar coordinates, thereby specifying constellation positions of the data of at least four points.

3. The reception synchronization control device according to claim 2, wherein the phase angle difference calculation processor shifts the data of at least four points forming said specified data so that a constellation position of one data among the specified data coincides with a reference point within the display surface of the polar coordinates, calculates a difference between a phase angle calculated based on the constellation positions of the specified data and a reference phase angle, and rotates the phase angle calculated based on the constellation positions of the specified data so that the calculated difference becomes substantially zero.

4. A non-transitory computer readable medium having a program stored therein to cause a reception synchronization control device to execute operations, which reception synchronization control device controls reception synchronization of a demodulator demodulating a signal transmitted by a phase modulation, said operations comprising:

detecting signal levels of the demodulated signals of at least two channels obtained by receiving a signal transmitted by a phase modulation;

obtaining a layout state of the demodulated signals on a coordinates plane surface, based on the detected signal levels;

specifying constellation positions of the demodulated signals, based on the layout state of the demodulated signals;

calculating a difference between a phase angle of the demodulated signals calculated based on the specified constellation positions and a reference phase angle that becomes a phase reference; and controlling said layout state of the demodulated signals so that the phase of the demodulated signal is rotated to offset the difference to establish a reception synchronization of the demodulated signal.

5. The non-transitory computer readable medium according to claim 4, wherein said obtaining a layout state of the demodulated signals on the coordinates plane surface specifies demodulated signal points which appear in the highest frequency on the coordinates plane surface.

6. The non-transitory computer readable medium according to claim 4, wherein said calculating calculates a difference in angle between a line defined by the reference phase angle and a line drawn between a center of a plurality of demodulated signal points and a reference point (O).

7. The non-transitory computer readable medium according to claim 4, wherein said calculating obtains an intersection of two diagonal lines connecting one pair of two demodulated signal points and the other pair of two demodulated signal points among four demodulated signal points, and calculates a difference between the intersection and the reference phase angle.

8. The non-transitory computer readable medium according to claim 4, wherein said calculating shifts the plurality of demodulated signal points so that any one of the plurality of demodulated signal points coincides with a reference position on the coordinates plane surface, and calculates a difference between a phase angle of the demodulated signal point and the reference phase angle.

9. A reception synchronization control method of controlling a reception of analog demodulated signals to be synchronized in demodulating the analog demodulated signals of at least two channels, the method comprising:

detecting signal levels of demodulated signals sampled from the analog demodulated signals of at least two channels obtained by receiving a signal transmitted by a phase modulation;

extracting sampled demodulated signals displayed on polar coordinates based on the detected signal levels;

specifying constellation positions of a plurality of kinds of data contained in the sampled demodulated signals; and calculating a difference between a phase angle calculated based on the constellation positions of the specified plurality of data and a reference phase angle, thereby controlling a difference between the phase angle and the reference phase angle to be within a predetermined range and establishing a reception synchronization of the analog demodulated signals.

10. The reception synchronization control method according to claim 9, wherein in specifying the constellation positions of the plurality of data, data of at least four points corresponding to the sampled demodulated signals of a highest appearance frequency are extracted from the sampled demodulated signals displayed on a display screen of the polar coordinates, thereby specifying constellation positions of the data of at least four points.

11. The reception synchronization control method according to claim 10, wherein in controlling the difference between the phase angle and the reference phase angle, the data of at least four points are shifted so that a constellation position of one data among the data of at least four points coincides with a reference point within the display screen of the polar coordinates, a difference between a phase angle calculated based on the constellation positions of the data of at least four points and a reference phase angle is calculated, and the phase angle is rotated so that a difference between the phase angle and the reference phase angle becomes substantially zero.

12. A reception synchronization control method of establishing reception synchronization of demodulated signals, the method comprising:

sampling the demodulated signals, and detecting signal levels of the sampled demodulated signals of at least two channels obtained from a signal transmitted by using a phase modulation;

determining a layout position of the sampled demodulated signals within a coordinates plane surface based on the detected signal levels, and specifying constellation positions of a plurality of demodulated data contained in the sampled demodulated signals;

calculating a phase angle of the demodulated signals based on the specified constellation positions;

calculating a phase angle difference between the phase angle and a reference phase angle; and controlling the phase of the demodulated signal to be rotated to offset the difference corresponding to the calculated phase angle difference to establish a reception synchronization of the demodulated signal.

13. A non-transitory computer readable medium having a program therein to be when receiving a signal transmitted by a phase modulation and demodulating the received signal into analog demodulated signals of at least two channels, thereby establishing reception synchronization of the analog demodulated signals, the program making a computer:
   detect signal levels of demodulated signals sampled from the analog demodulated signals of at least two channels obtained by receiving a signal transmitted by a phase modulation;
   extracting sampled demodulated signals displayed on polar coordinates based on the detected signal levels;
   specify constellation positions of a plurality of kinds of data contained in the sampled demodulated signals; and
   calculate a difference between a phase angle calculated based on the constellation positions of the specified plurality of data and a reference phase angle, thereby controlling the phase angle so that a difference between the phase angle and the reference phase angle is within a predetermined range and establishing a reception synchronization of the analog demodulated signals.

14. The non-transitory computer readable medium according to claim 13, wherein in specifying the constellation positions of the plurality of kinds of data, data of at least four points corresponding to sampled demodulated signals having a highest appearance frequency are extracted from among the sampled demodulated signals displayed on the polar coordinates display surface, and constellation positions of the data of at least four points are specified.

15. The non-transitory computer readable medium according to claim 14, wherein in controlling the phase angle, data of at least four points are extracted so that a constellation position of one data among the data of at least four points coincides with a reference point within the polar coordinates display surface, a difference between a phase angle calculated based on the constellation positions of the data of at least four points and the reference phase angle is calculated, and the phase angle is rotated so that the difference between the phase angle and the reference phase angle becomes substantially zero.

* * * * *